US012666371B2

(12) United States Patent
Yokomakura et al.

(10) Patent No.: US 12,666,371 B2
(45) Date of Patent: Jun. 23, 2026

(54) USER EQUIPMENTS, BASE STATIONS, AND METHODS FOR SRS TRANSMISSION AND TRANSMISSION POWER CONTROL

(71) Applicant: SHARP KABUSHIKI KAISHA, Sakai City (JP)

(72) Inventors: Kazunari Yokomakura, Sakai City (JP); Kai Ying, Vancouver, WA (US); Zhanping Yin, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 317 days.

(21) Appl. No.: 18/289,657

(22) PCT Filed: Mar. 28, 2022

(86) PCT No.: PCT/JP2022/014770
§ 371 (c)(1),
(2) Date: Nov. 6, 2023

(87) PCT Pub. No.: WO2022/239541
PCT Pub. Date: Nov. 17, 2022

(65) Prior Publication Data
US 2024/0259957 A1 Aug. 1, 2024

Related U.S. Application Data

(60) Provisional application No. 63/186,679, filed on May 10, 2021.

(51) Int. Cl.
*H04W 52/32* (2009.01)

(52) U.S. Cl.
CPC ................................. *H04W 52/325* (2013.01)

(58) Field of Classification Search
CPC ............. H04W 52/325; H04W 52/343; H04W 52/146; H04B 7/0617
See application file for complete search history.

(56) References Cited

U.S. PATENT DOCUMENTS

2023/0189254 A1* 6/2023 Go ............................ H04B 7/06
370/329
2024/0121851 A1* 4/2024 Matsumura .......... H04B 17/309

OTHER PUBLICATIONS

3GPP TS 38.211 V16.5.0 (Mar. 2021) Brd Generation Partnership Project; Technical Specification Group Radio Access Network; NR; Physical channels and modulation (Release 16).

(Continued)

*Primary Examiner* — Fayyaz Alam
(74) *Attorney, Agent, or Firm* — ScienBiziP, P.C.

(57) ABSTRACT

A user equipment (UE) is described. The UE includes reception circuitry configured to receive information of a first parameter, a second parameter, and a third parameter for a sounding reference signal (SRS) bandwidth in an uplink bandwidth part (UL BWP). The UE also includes transmission circuitry configured to transmit the SRS. In a case that the first parameter and the second parameter are received, a transmission power of the SRS is determined based on the first parameter and the second parameter. In a case that the first parameter, the second parameter, and the third parameter are received, the transmission power of the SRS is determined based on the first parameter, the second parameter, and the third parameter.

3 Claims, 13 Drawing Sheets

(56) References Cited

OTHER PUBLICATIONS

3GPP TS 38.211 V16.0.0 (Dec. 2019) Brd Generation Partnership Project; Technical Specification Group Radio Access Network; NR; Physical channels and modulation (Release 16).
3GPP TS 38.212 V16.0.0 (Dec. 2019) Brd Generation Partnership Project; Technical Specification Group Radio Access Network; NR; Multiplexing and channel coding (Release 16).
3GPP TS 38.213 V16.0.0 (Dec. 2019 Brd Generation Partnership Project; Technical Specification Group Radio Access Network; NR; Physical layer procedures for control (Release 16).
3GPP TS 38.214 V16.0.0 (Dec. 2019) Brd Generation Partnership Project; Technical Specification Group Radio Access Network; NR; Physical layer procedures for data (Release 16).
3GPP TS 38.321 V15.8.0 (Dec. 2019) Brd Generation Partnership Project; Technical Specification Group Radio Access Network; NR; Medium Access Control (MAC) protocol specification (Release 15).
3GPP TS 38.331 V15.18.0 (Jun. 2022) Brd Generation Partnership Project; Technical Specification Group Radio Access Network; NR; Radio Resource Control (RRC) protocol specification (Release 15).
Qualcomm Incorporated, "UL Reference Signals for NR Positioning", R1-1911133, 3GPP TSG RAN WG1 #98, Chongqing, China, Oct. 14-18, 2019.
CMCC, "Enhancements on SRS flexibility, coverage and capacity", R1-2102882, 3GPP TSG RAN WG1 #104b-e, e-Meeting, Apr. 12-20, 2021.

* cited by examiner

Supported Transmission Numerologies 201

| $\mu$ | $\Delta f = 2^{\mu} \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Number of OFDM Symbols Per Slot 203

| | Slot configuration | | | | | |
|---|---|---|---|---|---|---|
| | 0 | | | 1 | | |
| $\mu$ | $N_{symb}^{slot}$ | $N_{slot}^{frame,\mu}$ | $N_{slot}^{subframe,\mu}$ | $N_{symb}^{slot}$ | $N_{slot}^{frame,\mu}$ | $N_{slot}^{subframe,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

FIG. 2

PRB set(s) for DL control channel monitoring

E.g., DL control channel

Physical Resource Block (PRB) 491 (= 12 subcarriers)

E.g., DL shared channel

Frequency

| TCI state ID | {RS ID and QCL type} | |
|---|---|---|
| | {SS/PBCH block #0, QCL type A} | {SS/PBCH block #0, QCL type D} |
| 0 | | |
| 1 | {NZP CSI-RS resource #0, QCL type A} | {NZP CSI-RS resource #0, QCL type D} |
| 2 | {NZP CSI-RS resource #1, QCL type A} | {NZP CSI-RS resource #1, QCL type D} |
| 3 | {NZP CSI-RS resource #2, QCL type A} | {NZP CSI-RS resource #2, QCL type D} |
| 4 | {NZP CSI-RS resource #3, QCL type A} | {NZP CSI-RS resource #3, QCL type D} |
| 5 | {NZP CSI-RS resource #4, QCL type A} | {NZP CSI-RS resource #4, QCL type D} |
| 6 | {NZP CSI-RS resource #5, QCL type A} | {NZP CSI-RS resource #5, QCL type D} |
| 7 | {NZP CSI-RS resource #6, QCL type A} | {NZP CSI-RS resource #6, QCL type D} |

Receive information of a first parameter and a second parameter for a sounding reference signal bandwidth in an uplink bandwidth part

704

Transmit the sounding reference signal, where a transmission power of the sounding reference signal is determined based on the first parameter and the second parameter

800

802
Receive information of a first parameter, a second parameter, and a third parameter for a sounding reference signal bandwidth in an uplink bandwidth part 804
Transmit the sounding reference signal, where a transmission power of the sounding reference signal is determined based on the first parameter, the second parameter, and the third parameter

USER EQUIPMENTS, BASE STATIONS, AND METHODS FOR SRS TRANSMISSION AND TRANSMISSION POWER CONTROL

CROSS REFERENCE

This Nonprovisional application claims priority under 35 U.S.C. § 119 on provisional Application No. 63/186,679 on May 10, 2021, the entire contents of which are hereby incorporated by reference.

TECHNICAL FIELD

The present disclosure relates generally to communication systems. More specifically, the present disclosure relates to user equipments, base stations, and methods for sounding reference signal (SRS) transmission and transmission power control.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE) comprising: reception circuitry configured to receive information of a first parameter, a second parameter, and a third parameter for a sounding reference signal (SRS) bandwidth in an uplink bandwidth part (UL BWP); and transmission circuitry configured to transmit the SRS, wherein in a case that the first parameter and the second parameter are received, a transmission power of the SRS is determined based on the first parameter and the second parameter; and in a case that the first parameter, the second parameter, and the third parameter are received, the transmission power of the SRS is determined based on the first parameter, the second parameter, and the third parameter.

In one example, a base station apparatus comprising: transmission circuitry configured to transmit information of a first parameter, a second parameter, and a third parameter for a sounding reference signal (SRS) bandwidth in an uplink bandwidth part (UL BWP); and reception circuitry configured to receive the SRS, wherein in a case that the first parameter and the second parameter are transmitted, a transmission power of the SRS is determined based on the first parameter and the second parameter; and in a case that the first parameter, the second parameter, and the third parameter are transmitted, the transmission power of the SRS is determined based on the first parameter, the second parameter, and the third parameter.

In one example, a communication method of a user equipment (UE), the method comprising: receiving information of parameters for a sounding reference signal (SRS) bandwidth in an uplink bandwidth part (UL BWP); and transmitting the SRS, wherein in a case that a first parameter and a second parameter are received, a transmission power of the SRS is determined based on the first parameter and the second parameter; and in a case that the first parameter, the second parameter, and a third parameter are received, the transmission power of the SRS is determined based on the first parameter, the second parameter, and the third parameter.

BRIEF DESCRIPTION OF DRAWINGS

FIG. 2 shows examples of multiple numerologies.

FIG. 6 illustrates an example of transmission configuration indication (TCI) states.

DESCRIPTION OF EMBODIMENTS

Figure 1:
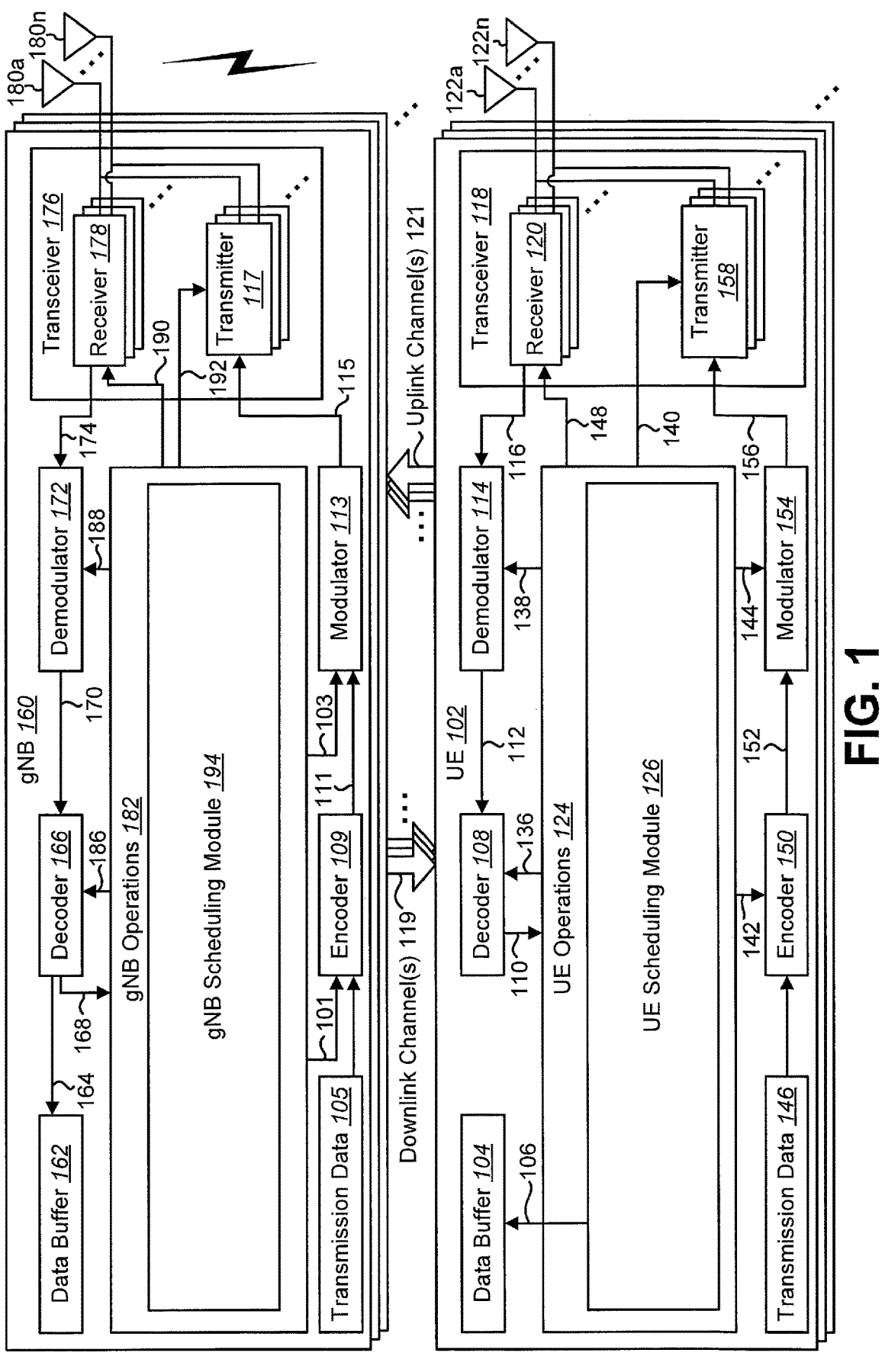
FIG. 1 is a block diagram illustrating one implementation of one or more gNBs and one or more UEs in which systems and methods for signaling may be implemented.

A user equipment (UE) is described. The UE includes reception circuitry configured to receive information of a first parameter, a second parameter, and a third parameter for a sounding reference signal (SRS) bandwidth in an uplink bandwidth part (UL BWP). The UE also includes transmission circuitry configured to transmit the SRS. In a case that the first parameter and the second parameter are received, a transmission power of the SRS is determined based on the first parameter and the second parameter. In a case that the first parameter, the second parameter, and the third parameter are received, the transmission power of the SRS is determined based on the first parameter, the second parameter, and the third parameter.

A base station apparatus is also described. The base station includes transmission circuitry configured to transmit information of a first parameter, a second parameter, and a third parameter for a sounding reference signal (SRS) bandwidth in an uplink bandwidth part (UL BWP). The base station also includes reception circuitry configured to receive the SRS. In a case that the first parameter and the second parameter are transmitted, a transmission power of the SRS is determined based on the first parameter and the second parameter. In a case that the first parameter, the second parameter, and the third parameter are transmitted, the transmission power of the SRS is determined based on the first parameter, the second parameter, and the third parameter.

A communication method of a user equipment (UE) is also described. The method includes receiving information of parameters for a sounding reference signal (SRS) bandwidth in an uplink bandwidth part (UL BWP). The method also includes transmitting the SRS. In a case that a first parameter and a second parameter are received, a transmission power of the SRS is determined based on the first parameter and the second parameter. In a case that the first parameter, the second parameter, and a third parameter are received, the transmission power of the SRS is determined based on the first parameter, the second parameter, and the third parameter.

A communication method of a base station apparatus is also described. The method includes transmitting information of parameters for a sounding reference signal (SRS) bandwidth in an uplink bandwidth part (UL BWP). The method also includes receiving the SRS. In a case that a first parameter and a second parameter are transmitted, a transmission power of the SRS is determined based on the first parameter and the second parameter. In a case that the first parameter, the second parameter, and a third parameter are transmitted, the transmission power of the SRS is determined based on the first parameter, the second parameter, and the third parameter.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A), LTE-Advanced Pro, 5G New Radio (5th Generation NR) and/or other standards (e.g., 3GPP Releases 8, 9, 10, 11, 12, 13, 14, 15 and/or 16, etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc.

Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB), a g Node B (gNB) or some other similar terminology. As the scope of the disclosure should not be limited to 3GPP standards, the terms "base station," "Node B," "eNB," "gNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. A gNB may also be more generally referred to as a base station device.

It should be noted that as used herein, a "cell" may be any communication channel that is specified by standardization or regulatory bodies to be used for International Mobile Telecommunications-Advanced (IMT-Advanced) or IMT-2020, and all of it or a subset of it may be adopted by 3GPP as licensed bands or unlicensed bands (e.g., frequency bands) to be used for communication between an eNB or gNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra Reliable and Low Latency Communication) transmission, and mMTC (massive Machine Type Communication) transmission. And, in NR, transmissions for different services may be specified (e.g., configured) for one or more bandwidth parts (BWPs) in a serving cell and/or for one or more serving cells. A user equipment (UE) may receive a downlink signal(s) and/or transmit of an uplink signal(s) in the BWP(s) of the serving cell and/or serving cells.

In order for the services to use the time, frequency and/or spatial resources efficiently, it would be useful to be able to efficiently control downlink and/or uplink transmissions. Therefore, a procedure for efficient control of downlink and/or uplink transmissions should be designed. Accordingly, a detailed design of a procedure for downlink and/or uplink transmissions may be beneficial.

In some examples of the techniques described herein, uplink control information (UCI) for ultra-reliable low-latency communication (URLLC) may provide higher reliability and lower latency than enhanced mobile broadband (eMBB). Some examples of the techniques described herein may achieve lower latency in mini-slot repetition by using an earliest demodulation reference signal (DMRS) satisfying timing equal to or greater than an indicated timing in a repeated physical uplink shared channel (PUSCH).

In some examples of the techniques described herein, a UE may include reception circuitry configured to receive a physical downlink control channel (PDCCH). The UE may include transmission circuitry configured to transmit UCI on a PUSCH, where the UCI on the PUSCH is mapped on and/or around an earliest DMRS satisfying timing equal to or greater than a timing indicated by DCI in the PDCCH.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for signaling (e.g., SRS communication) may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n. In some implementations, the term "base station," "eNB," and/or "gNB" may refer to and/or may be replaced by the term "Transmission Reception Point (TRP)." For example, the gNB 160 described in connection with FIG. 1 may be a TRP in some implementations.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (physical uplink shared channel)) and/or a physical control channel (e.g., PUCCH (physical uplink control channel)), etc. The one or more gNBs 160 may also transmit information or data to the one or more UEs 102 using one or more downlink channels 119, for instance. Examples of downlink channels 119 include a physical shared channel (e.g., PDSCH (physical downlink shared channel) and/or a physical control channel (PDCCH (physical downlink control channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE decoded signal 110) may comprise overhead data and/or control data. For example, the second UE decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE scheduling module 126 may perform downlink reception(s) and uplink transmission(s). The downlink reception(s) include reception of data, reception of downlink control information, and/or reception of downlink reference signals. Also, the uplink transmissions include transmission of data, transmission of uplink control information, and/or transmission of uplink reference signals. In some examples, the UE 102, UE operations module 124 and/or the UE scheduling module 126 may perform one or more of the functions, operations, methods and/or procedures described herein. For instance, the UE 102 may perform one or more of the functions, operations, methods, and/or procedures regarding DCI triggering, aperiodic SRS, SRS offset timing and/or triggering SRS resource set(s), etc. In some examples, the UE 102, UE operations module 124, and/or UE scheduling module 126 may perform the method 700 described in relation to FIG. 7, the method 800 described in relation to FIG. 8, and/or one or more of the operations described in relation to FIG. 6. For instance, the UE 102, UE operations module 124, and/or UE scheduling module 126 may determine an SRS bandwidth and/or transmission power based on a first parameter, a second parameter, and/or a third parameter (depending on whether the third parameter is configured and/or received, for instance).

Also, in a carrier aggregation (CA), the gNB 160 and the UE 102 may communicate with each other using one or more serving cells. The one or more serving cells may include one primary cell and one or more secondary cells. For example, the gNB 160 may transmit, by using the RRC message, information used for configuring one or more secondary cells to form together with the primary cell a set of serving cells. Namely, the set of serving cells may include one primary cell and one or more secondary cells. In some examples, the primary cell may be always activated. The gNB 160 may activate one or more secondary cell within the configured secondary cells. In some examples in the downlink, a carrier corresponding to the primary cell may be the downlink primary component carrier (i.e., the DL PCC), and a carrier corresponding to a secondary cell may be the downlink secondary component carrier (i.e., the DL SCC). In the uplink, a carrier corresponding to the primary cell may be the uplink primary component carrier (i.e., the UL PCC), and a carrier corresponding to the secondary cell may be the uplink secondary component carrier (i.e., the UL SCC).

In a radio communication system, physical channels (uplink physical channels and/or downlink physical channels) may be defined. The physical channels (uplink physical channels and/or downlink physical channels) may be used for transmitting information that is delivered from a higher layer.

In some examples, in uplink, a Physical Random Access Channel (PRACH) may be defined, set up, and/or utilized. In some approaches, the PRACH (e.g., the random access procedure) may be used for an initial access connection establishment procedure, a handover procedure, a connection re-establishment, a timing adjustment (e.g., a synchronization for an uplink transmission, for UL synchronization), and/or for requesting an uplink shared channel (UL-SCH) resource (e.g., the uplink physical shared channel (PSCH) (e.g., PUSCH) resource).

In some examples, a physical uplink control channel (PUCCH) may be defined, set up, and/or utilized. The PUCCH may be used for transmitting uplink control information (UCI). The UCI may include hybrid automatic repeat request-acknowledgement (HARQ-ACK), channel state information (CSI), and/or a scheduling request (SR). The HARQ-ACK may be used for indicating a positive acknowledgement (ACK) or a negative acknowledgment (NACK) for downlink data (e.g., Transport block(s), Medium Access Control Protocol Data Unit (MAC PDU), and/or Downlink Shared Channel (DL-SCH)). The CSI may be used for indicating state of downlink channel (e.g., a downlink signal (s)). The SR may be used for requesting resources of uplink data (e.g., Transport block(s), MAC PDU, and/or Uplink Shared Channel (UL-SCH)).

Here, the DL-SCH and/or the UL-SCH may be a transport channel that is used in the MAC layer. Also, a transport block(s) (TB(s)) and/or a MAC PDU may be defined as a unit(s) of the transport channel used in the MAC layer. The transport block may be defined as a unit of data delivered from the MAC layer to the physical layer. The MAC layer may deliver the transport block to the physical layer (e.g., the MAC layer delivers the data as the transport block to the physical layer). In the physical layer, the transport block may be mapped to one or more codewords.

In some examples, in downlink, a physical downlink control channel (PDCCH) may be defined, set up, and/or utilized. The PDCCH may be used for transmitting downlink control information (DCI). In some approaches, more than one DCI format may be defined for DCI transmission on the PDCCH. Namely, fields may be defined in the DCI format(s) and/or the fields may be mapped to the information bits (e.g., DCI bits).

Additionally or alternatively, a physical downlink shared channel (PDSCH) and/or a physical uplink shared channel (PUSCH) may be defined, set up, and/or utilized. For example, in a case that the PDSCH (e.g., the PDSCH resource) is scheduled by using the DCI format(s) for the downlink, the UE 102 may receive the downlink data, on the scheduled PDSCH (e.g., the PDSCH resource). Additionally or alternatively, in a case that the PUSCH (e.g., the PUSCH resource) is scheduled by using the DCI format(s) for the uplink, the UE 102 may transmit the uplink data, on the scheduled PUSCH (e.g., the PUSCH resource). For example, the PDSCH may be used to transmit the downlink data (e.g., DL-SCH(s), a downlink transport block(s)). Additionally or alternatively, the PUSCH may be used to transmit the uplink data (e.g., UL-SCH(s), an uplink transport block (s)).

The PDSCH and/or the PUSCH may be used to transmit information of a higher layer (e.g., a radio resource control (RRC)) layer, and/or a MAC layer). For example, the PDSCH (e.g., from the gNB 160 to the UE 102) and/or the PUSCH (e.g., from the UE 102 to the gNB 160) may be used to transmit a RRC message (a RRC signal). Additionally or alternatively, the PDSCH (e.g., from the gNB 160 to the UE 102) and/or the PUSCH (e.g., from the UE 102 to the gNB 160) may be used to transmit a MAC control element (a MAC CE). The RRC message and/or the MAC CE may be referred to as a higher layer signal.

In some approaches, a physical broadcast channel (PBCH) may be defined, set up, and/or utilized. For example, the PBCH may be used for broadcasting a master information block (MIB). System information may be divided into the MIB and a number of system information block(s) (SIB(s)). For example, the MIB may be used for carrying and/or including minimum system information. Additionally or alternatively, the SIB(s) may be used for carrying system information messages.

In some approaches, in downlink, one or more synchronization signals (SS(s)) may be defined, set up, and/or utilized. The SS(s) may be used for acquiring time and/or frequency synchronization with a cell. Additionally or alternatively, the SS(s) may be used for detecting a physical layer cell ID of the cell. Examples of SSs may include a primary SS and a secondary SS.

In some examples, an SS/PBCH block may be defined as a set of a primary SS, a secondary SS, and a PBCH. Tin the time domain, the SS/PBCH block may include (e.g., may consist of) 4 OFDM symbols, numbered in increasing order from 0 to 3 within the SS/PBCH block, where PSS, SSS, and PBCH with associated demodulation reference signal (DMRS) may be mapped to symbols. One or more SS/PBCH block may be mapped within a certain time duration (e.g., 5 msec).

In some examples, the SS/PBCH block can be used for beam measurement, radio resource management (RRM) measurement, and radio link control (RLM) measurement. Specifically, the secondary synchronization signal (SSS) can be used for the measurement.

In the radio communication for uplink, UL RS(s) may be used as uplink physical signal(s). Additionally or alternatively, in the radio communication for downlink, DL RS(s) may be used as downlink physical signal(s). In some examples, the uplink physical signal(s) and/or the downlink physical signal(s) may not be used to transmit information that is provided from the higher layer, but may be used by a physical layer.

In some examples, the downlink physical channel(s) and/or the downlink physical signal(s) described herein may be assumed to be included in a downlink signal (e.g., a DL signal(s)) in some implementations for the sake of simple descriptions. Additionally or alternatively, the uplink physical channel(s) and/or the uplink physical signal(s) described herein may be assumed to be included in an uplink signal (i.e., an UL signal(s)) in some implementations for the sake of simple descriptions.

Some approaches for an SRS trigger without UL-SCH and/or without CSI are described herein. In some examples, the gNB 160 may indicate DCI triggering of one or more SRS resource set(s) on a PDCCH. The UE 102 may transmit one or more aperiodic SRS within the indicated SRS resource set(s) based on the DCI triggering of one or more SRS resource set(s).

Additionally or alternatively, the DCI may include one or more information elements. For example, the DCI may include one or more of the following information elements:

(1) information on an SRS timing offset (e.g., SRS triggering offset) and/or (2) information on one or more SRS resource set(s).

Additionally or alternatively, an SRS timing offset may be defined in terms of a slot. For example, the SRS timing offset may be applied based on a reference slot. A reference slot may be a (e.g., may be defined as the) slot with the triggering DCI (e.g., a slot where the DCI on a PDCCH is received). In some examples, the reference slot may be a (e.g., may be defined by the) slot indicated by a legacy triggering offset. The legacy triggering offset may be configured by RRC. In some examples, the legacy triggering offset may be rephased by a configured triggering offset.

Additionally or alternatively, a DCI format (e.g., DCI format 0_X) may be defined and/or utilized for triggering one or more SRS resource set(s). In some examples, a DCI of the DCI format may indicate triggering one or more SRS resources only. In some examples, the DCI may not schedule UL-SCH (or PUSCH) and/or may not trigger one or more CSI report(s). If a UL-SCH is scheduled or one or more CSI report(s) is requested, a DCI format (e.g., DCI format 0_1 or DCI format 0_2) may be used.

Additionally or alternatively, a DCI format (e.g., DCI format 0_1 or DCI format 0_2) may be used for triggering one or more SRS resources within the indicated or configured SRS resource set(s). In some examples, a field in the DCI format may be defined to indicate whether the DCI format is to trigger only SRS resource(s) or not.

Additionally or alternatively, a DCI format for aperiodic SRS without UL-SCH and without CSI may be defined differently from a DCI format for scheduling a PUSCH and/or CSI request in some examples. In some approaches, if a DCI format for aperiodic SRS without UL-SCH and without CSI is defined differently from a DCI format for scheduling a PUSCH and/or CSI request, a field in the DCI to identify which DCI format is received by a UE 102 may be included in each DCI format.

Additionally or alternatively, cyclic redundancy check (CRC) parity bits of DCI may be scrambled by an RNTI. For example, CRC parity bits of a DCI for aperiodic SRS without UL-SCH and without CSI may be scrambled by C-RNTI or another RNTI (e.g., a new RNTI other than existing RNTI in NR). Additionally or alternatively, whether a UE 102 receives DCI of the DCI format for aperiodic SRS without UL-SCH and without CSI may be configured by a gNB 160 in an RRC layer.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information in some examples.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162, and/or a gNB operations module 182. For example, one or more reception and/or transmission paths may be implemented in a gNB 160. For convenience, only a single transceiver 176, decoder 166, demodulator 172, encoder 109, and modulator 113 are illustrated in the gNB 160, though multiple parallel elements (e.g., transceivers 176, decoders 166, demodulators 172, encoders 109, and/or modulators 113, etc.) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB scheduling module 194. The gNB scheduling module 194 may perform scheduling of downlink and/or uplink transmissions as described herein. In some examples, the gNB 160, gNB operations module 182, and/or the gNB scheduling module 194 may perform one or more of the functions, operations, methods, and/or procedures described herein. For instance, the gNB 160 may perform one or more of the functions, operations, methods, and/or procedures regarding DCI triggering, aperiodic SRS, SRS offset timing, and/or triggering SRS resource set(s), etc. In some examples, the gNB 160, gNB operations module 182, and/or gNB scheduling module 194 may perform one or more operations described in relation to FIG. 6, FIG. 7, and/or FIG. 8. For instance, the gNB 160, the gNB operations module 182, and the gNB scheduling module 194 may configure and/or transmit information of a first parameter, a second parameter, and/or a third parameter. The first parameter, the second parameter, and/or the third parameter may be utilized to determine an SRS bandwidth and/or transmission power (depending on whether the third parameter is transmitted and/or configured, for instance). The gNB 160 may receive the SRS. The SRS may be utilized for one or more operations (e.g., channel sounding, beam management, and/or precoding, etc.).

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time, and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

FIG. 2 shows examples of multiple numerologies 201. For instance, FIG. 2 provides some examples of numerologies and/or slot configurations that may be utilized in accordance with one or more of the techniques and/or implementations described herein. As shown in FIG. 2, multiple numerologies 201 (e.g., multiple subcarrier spacing) may be supported. For example, u (e.g., a subcarrier space configuration) and a cyclic prefix (e.g., the u and the cyclic prefix for a carrier bandwidth part) may be configured by higher layer parameters (e.g., a RRC message) for the downlink and/or the uplink. Here, 15 kHz may be a reference numerology 201. For example, an RE of the reference numerology 201 may be defined with a subcarrier spacing of 15 kHz in a frequency domain and 2048 Ts+CP length (e.g., 160 Ts or 144 Ts) in a time domain, where Ts denotes a baseband sampling time unit defined as 1/(15000*2048) seconds.

Additionally or alternatively, a number of OFDM symbol(s) 203 per slot $$\left(N_{symb}^{slot}\right)$$

may be determined based on the $\mu$ (e.g., the subcarrier space configuration). Here, for example, a slot configuration 0 (e.g., the number of OFDM symbols 203 per slot may be 14).

Figure 3:
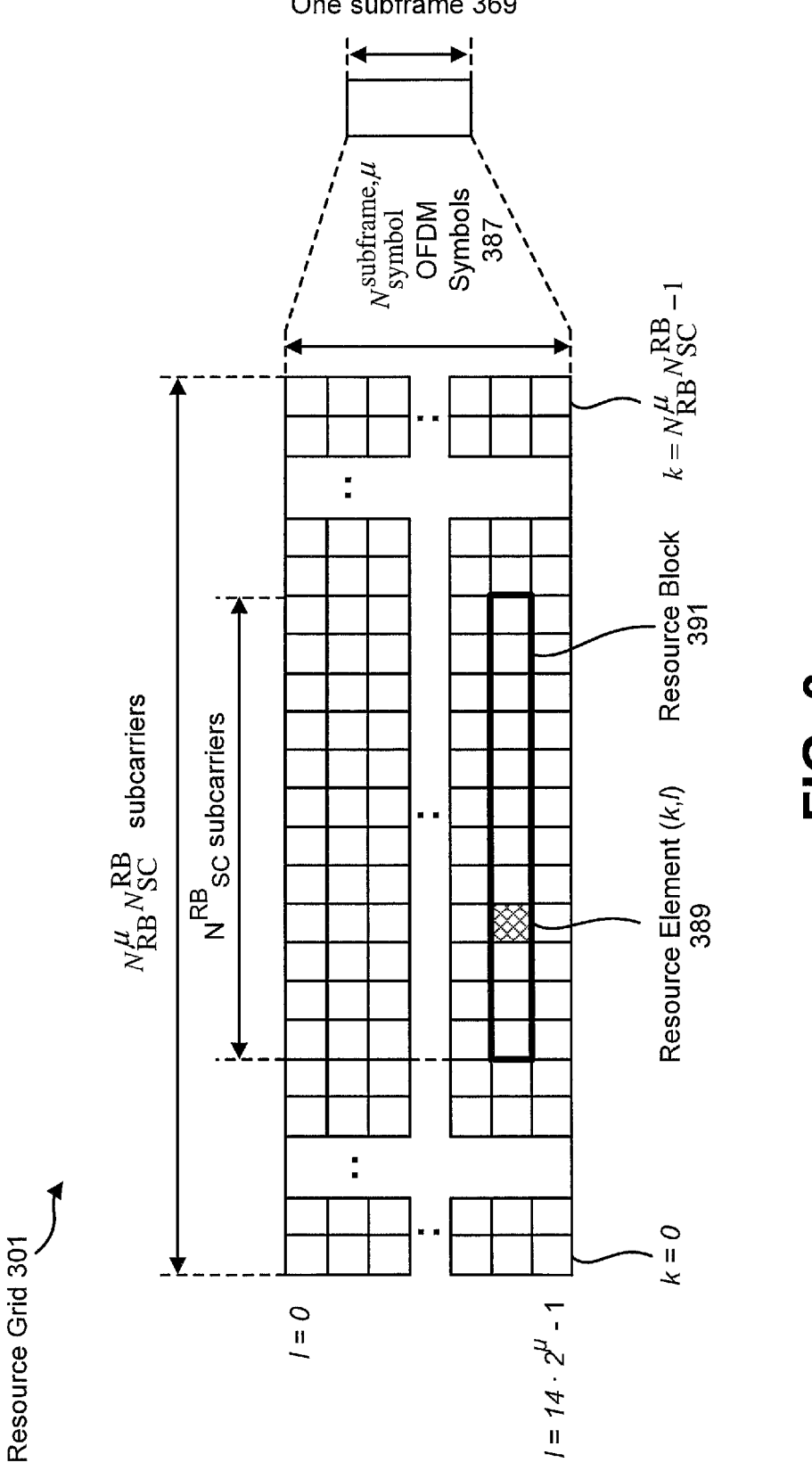
FIG. 3 is a diagram illustrating one example of a resource grid and resource block.

FIG. 3 is a diagram illustrating one example of a resource grid 301 and resource block 391 (e.g., for the downlink and/or the uplink). The resource grid 301 and resource block 391 illustrated in FIG. 3 may be utilized in some implementations of the systems and methods disclosed herein.

In FIG. 3, one subframe 369 may include $$N_{symbol}^{subframe,\mu}$$

symbols 387. Additionally or symbol alternatively, a resource block 391 may include a number of resource elements (RE) 389. Here, in the downlink, the OFDM access scheme with cyclic prefix (CP) may be employed, which may be also referred to as CP-OFDM. A downlink radio frame may include multiple pairs of downlink resource blocks (RBs) 391 which may be also referred to as physical resource blocks (PRBs). The downlink RB pair is a unit for assigning downlink radio resources, defined by a predetermined bandwidth (RB bandwidth) and a time slot. The downlink RB pair may include two downlink RBs 391 that are continuous in the time domain. Additionally or alternatively, the downlink RB 391 may include twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) 389 and is uniquely identified by the index pair (k,l), where k and l are indices in the frequency and time domains, respectively.

Additionally or alternatively, in the uplink, in addition to CP-OFDM, a SingleCarrier Frequency Division Multiple Access (SC-FDMA) access scheme may be employed, which is also referred to as Discrete Fourier Transform-Spreading OFDM (DFT-S-OFDM). An uplink radio frame may include multiple pairs of uplink resource blocks 391. The uplink RB pair is a unit for assigning uplink radio resources, defined by a predetermined bandwidth (RB bandwidth) and a time slot. The uplink RB pair may include two uplink RBs 391 that are continuous in the time domain. The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a resource element (RE) 389 and is uniquely identified by the index pair (k,l) in a slot, where k and l are indices in the frequency and time domains respectively.

Each element in the resource grid 301 (e.g., antenna port p) and the subcarrier configuration μ is called a resource element 389 and is uniquely identified by the index pair (k,l) where k=0, . . . , $$N_{RB}^{\mu}N_{SC}^{RB} - 1$$

is the index in the frequency domain and l refers to the symbol position in the time domain. The resource element (k,l) 389 on the antenna port p and the subcarrier spacing configuration u is denoted $(k,l)p,\mu$. The physical resource block 391 is defined as $$N_{SC}^{RB} = 12$$

consecutive subcarriers in the frequency domain. The physical resource blocks 391 are numbered from 0 to $$N_{RB}^{\mu} - 1$$

in the frequency domain. The relation between the physical resource block number $n_{PRB}$ in the frequency domain and the resource element (k,l) is given by $$n_{PRB} = \left\lfloor \frac{k}{N_{SC}^{RB}} \right\rfloor.$$

In some examples (e.g., in NR), the following reference signals may be defined:

NZP CSI-RS (non-zero power channel state information reference signal)

ZP CSI-RS (Zero-power channel state information reference signal)

DMRS (demodulation reference signal)

SRS (sounding reference signal)

NZP CSI-RS may be used for channel tracking (e.g., synchronization), measurement to obtain CSI (CSI measurement including channel measurement and interference measurement), and/or measurement to obtain the beam forming performance. NZP CSI-RS may be transmitted in the downlink (gNB to UE). NZP CSI-RS may be transmitted in an aperiodic or semi-persistent or periodic manner. Additionally, the NZP CSI-RS can be used for radio resource management (RRM) measurement and radio link control (RLM) measurement.

ZP CSI-RS may be used for interference measurement and transmitted in the downlink (gNB to UE). ZP CSI-RS may be transmitted in an aperiodic or semipersistent or periodic manner. DMRS may be used for demodulation for the downlink (gNB to UE), the uplink (UE to gNB), and the sidelink (UE to UE).

SRS may be used for channel sounding and beam management. The SRS may be transmitted in the uplink (UE to gNB).

In some approaches, DCI may be used. One or more DCI formats may be utilized. In some examples, the following DCI formats may be defined:

DCI format 0_0

DCI format 0_1

DCI format 0_2

DCI format 1_0

DCI format 1_1

DCI format 1_2

DCI format 2_0

DCI format 2_1

DCI format 2_2

DCI format 2_3

DCI format 2_4

DCI format 2_5

DCI format 2_6

DCI format 3_0

DCI format 3_1

DCI format 1_0 may be used for the scheduling of PUSCH in one cell. The DCI may be transmitted by means of the DCI format 0_0 with cyclic redundancy check (CRC) scrambled by Cell Radio Network Temporary Identifiers (C-RNTI) or Configured Scheduling RNTI (CS-RNTI) or Modulation and Coding Scheme-Cell RNTI (MCS-C-RNTI).

DCI format 0_1 may be used for the scheduling of one or multiple PUSCH in one cell, or indicating configured grant downlink feedback information (CG-DFI) to a UE. The DCI may be transmitted by means of the DCI format 0_1 with CRC scrambled by C-RNTI or CS-RNTI or semi-persistent channel state information (SP-CSI-RNTI) or MCS-C-RNTI. The DCI format 0_2 may be used for CSI request (e.g., aperiodic CSI reporting or semi-persistent CSI request). The DCI format 0_2 may be used for SRS request (e.g., aperiodic SRS transmission).

DCI format 0_2 may be used for the scheduling of PUSCH in one cell. The DCI may be transmitted by means of the DCI format 0_2 with CRC scrambled by C-RNTI or CS-RNTI or SP-CSI-RNTI or MCS-C-RNTI. The DCI format 0_2 may be used for scheduling of PUSCH with high priority and/or low latency (e.g., URLLC). The DCI format 0_2 may be used for CSI request (e.g., aperiodic CSI reporting or semipersistent CSI request). The DCI format 0_2 may be used for SRS request (e.g., aperiodic SRS transmission).

Additionally, for example, the DCI included in the DCI format 0_Y (Y=0, 1, 2, . . . ) may be a BWP indicator (e.g., for the PUSCH). Additionally or alternatively, the DCI included in the DCI format 0_Y may be a frequency domain resource assignment (e.g., for the PUSCH). Additionally or alternatively, the DCI included in the DCI format 0_Y may be a time domain resource assignment (e.g., for the PUSCH). Additionally or alternatively, the DCI included in the DCI format 0_Y may be a modulation and coding scheme (e.g., for the PUSCH). Additionally or alternatively, the DCI included in the DCI format 0_Y may be a new data indicator. Additionally or alternatively, the DCI included in the DCI format 0_Y may be a TPC command for scheduled PUSCH. Additionally or alternatively, the DCI included in the DCI format 0_Y may be a CSI request that is used for requesting the CSI reporting. Additionally or alternatively, as described below, the DCI included in the DCI format 0_Y may be information used for indicating an index of a configuration of a configured grant. Additionally or alternatively, the DCI included in the DCI format 0_Y may be the priority indication (e.g., for the PUSCH transmission and/or for the PUSCH reception).

DCI format 1_0 may be used for the scheduling of PDSCH in one DL cell. The DCI is transmitted by means of the DCI format 1_0 with CRC scrambled by C-RNTI or CS-RNTI or MCS-C-RNTI. The DCI format 1_0 may be used for random access procedure initiated by a PDCCH order. Additionally or alternatively, the DCI may be transmitted by means of the DCI format 1_0 with CRC scrambled by system information RNTI (SI-RNTI), and the DCI may be used for system information transmission and/or reception. Additionally or alternatively, the DCI may be transmitted by means of the DCI format 1_0 with CRC scrambled by random access RNTI (RA-RNTI) for random access response (RAR) (e.g., Msg 2) or msgB-RNTI for 2-step RACH. Additionally or alternatively, the DCI may be transmitted by means of the DCI format 1_0 with CRC scrambled by temporally cell RNTI (TC-RNTI), and the DCI may be used for msg3 transmission by a UE 102.

DCI format 1_1 may be used for the scheduling of PDSCH in one cell. The DCI may be transmitted by means of the DCI format 1_1 with CRC scrambled by C-RNTI or CS-RNTI or MCS-C-RNTI. The DCI format 1_1 may be used for SRS request (e.g., aperiodic SRS transmission).

DCI format 1_2 may be used for the scheduling of PDSCH in one cell. The DCI may be transmitted by means of the DCI format 1_2 with CRC scrambled by C-RNTI or CS-RNTI or SP-CSI-RNTI or MCS-C-RNTI. The DCI format 1_2 may be used for scheduling of PDSCH with high priority and/or low latency (e.g., URLLC). The DCI format 1_2 may be used for SRS request (e.g., aperiodic SRS transmission).

Additionally, for example, the DCI included in the DCI format 1_X may be a BWP indicator (e.g., for the PDSCH). Additionally or alternatively, the DCI included in the DCI format 1_X may be frequency domain resource assignment (e.g., for the PDSCH). Additionally or alternatively, the DCI included in the DCI format 1_X may be a time domain resource assignment (e.g., for the PDSCH). Additionally or alternatively, the DCI included in the DCI format 1_X may be a modulation and coding scheme (e.g., for the PDSCH). Additionally or alternatively, the DCI included in the DCI format 1_X may be a new data indicator. Additionally or alternatively, the DCI included in the DCI format 1_X may be a TPC command for scheduled PUCCH. Additionally or alternatively, the DCI included in the DCI format 1_X may be a CSI request that is used for requesting (e.g., triggering) transmission of the CSI (e.g., CSI reporting (e.g., aperiodic CSI reporting)). Additionally or alternatively, the DCI included in the DCI format 1_X may be a PUCCH resource indicator. Additionally or alternatively, the DCI included in the DCI format 1_X may be a PDSCH-to-HARQ feedback timing indicator. Additionally or alternatively, the DCI included in the DCI format 1_X may be the priority indication (e.g., for the PDSCH transmission and/or the PDSCH reception). Additionally or alternatively, the DCI included in the DCI format 1_X may be the priority indication (e.g., for the HARQ-ACK transmission for the PDSCH and/or the HARQ-ACK reception for the PDSCH).

DCI format 2_0 may be used for notifying the slot format, channel occupancy time (COT) duration for unlicensed band operation, available resource block (RB) set, and search space group switching. The DCI may transmitted by means of the DCI format 2_0 with CRC scrambled by slot format indicator RNTI (SFI-RNTI).

DCI format 2_1 may be used for notifying the physical resource block(s) (PRB(s)) and orthogonal frequency division multiplexing (OFDM) symbol(s) where the UE may assume no transmission is intended for the UE. The DCI is transmitted by means of the DCI format 2_1 with CRC scrambled by interrupted transmission RNTI (INT-RNTI).

DCI format 2_2 may be used for the transmission of transmission power control (TPC) commands for PUCCH and PUSCH. The following information is transmitted by means of the DCI format 2_2 with CRC scrambled by TPC-PUSCH-RNTI or TPC-PUCCH-RNTI. In a case that the CRC is scrambled by TPC-PUSCH-RNTI, the indicated one or more TPC commands may be applied to the TPC loop for PUSCHs. In a case that the CRC is scrambled by TPC-PUCCH-RNTI, the indicated one or more TPC commands may be applied to the TPC loop for PUCCHs.

DCI format 2_3 may be used for the transmission of a group of TPC commands for SRS transmissions by one or more UEs. Along with a TPC command, a SRS request may also be transmitted. The DCI may be is transmitted by means of the DCI format 2_3 with CRC scrambled by TPC-SRS-RNTI.

DCI format 2_4 may be used for notifying the PRB(s) and OFDM symbol(s) where the UE cancels the corresponding UL transmission. The DCI may be transmitted by means of the DCI format 2_4 with CRC scrambled by cancellation indication RNTI (CI-RNTI).

DCI format 2_5 may be used for notifying the availability of soft resources for integrated access and backhaul (IAB) operation. The DCI may be transmitted by means of the DCI format 2_5 with CRC scrambled by availability indication RNTI (AI-RNTI).

DCI format 2_6 may be used for notifying the power saving information outside discontinuous reception (DRX) Active Time for one or more UEs. The DCI may be transmitted by means of the DCI format 2_6 with CRC scrambled by power saving RNTI (PS-RNTI).

DCI format 3_0 may be used for scheduling of NR physical sidelink control channel (PSCCH) and NR physical sidelink shared channel (PSSCH) in one cell. The DCI may be transmitted by means of the DCI format 3_0 with CRC scrambled by sidelink RNTI (SL-RNTI) or sidelink configured scheduling RNTI (SL-CS-RNTI). This may be used for vehicular to everything (V2X) operation for NR V2X UE(s).

DCI format 3_1 may be used for scheduling of LTE PSCCH and LTE PSSCH in one cell. The following information is transmitted by means of the DCI format 3_1 with CRC scrambled by SL-L-CS-RNTI. This may be used for LTE V2X operation for LTE V2X UE(s).

The UE 102 may monitor one or more DCI formats on common search space set (CSS) and/or UE-specific search space set (USS). A set of PDCCH candidates for a UE to monitor may be defined in terms of PDCCH search space sets. A search space set can be a CSS set or a USS set. A UE 102 monitors PDCCH candidates in one or more of the following search spaces sets. The search space may be defined by a PDCCH configuration in a RRC layer.

a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG a Type0A-PDCCH CSS set configured by searchSpaceOtherSystemInformation in PDCCH-ConfigCommon for a DCI format with CRC scrambled by a SI-RNTI on the primary cell of the MCG a Type1-PDCCH CSS set configured by ra-SearchSpace in PDCCH-ConfigCommon for a DCI format with CRC scrambled by a RA-RNTI or a TC-RNTI on the primary cell a Type2-PDCCH CSS set configured by paging-SearchSpace in PDCCH-ConfigCommon for a DCI format with CRC scrambled by a P-RNTI on the primary cell of the MCG a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

The UE 102 may monitor a set of candidates of the PDCCH in one or more control resource sets (e.g., CORESETs) on the active DL bandwidth part (BWP) on each activated serving cell according to corresponding search space sets. The CORESETs may be configured from gNB 160 to a UE 102, and the CSS set(s) and the USS set(s) are defined in the configured CORESET. One or more CORESET may be configured in a RRC layer.

Figure 4:
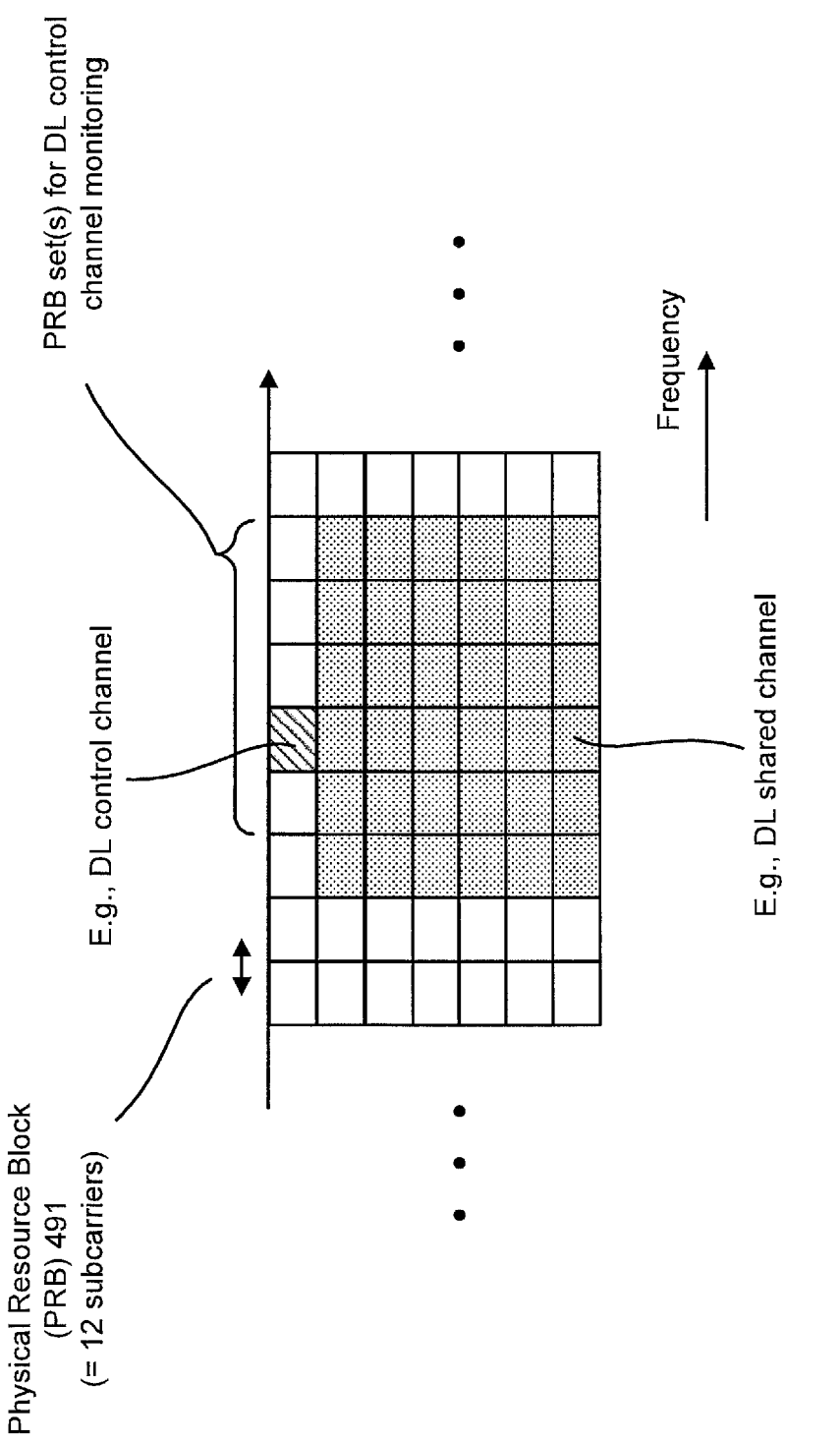
FIG. 4 shows examples of resource regions.

FIG. 4 shows examples of resource regions (e.g., resource region of the downlink). One or more sets 401 of PRB(s) 491 (e.g., a control resource set (e.g., CORESET)) may be configured for DL control channel monitoring (e.g., the PDCCH monitoring). For example, the CORESET is, in the frequency domain and/or the time domain, a set 401 of PRBs 491 within which the UE 102 attempts to decode the DCI (e.g., the DCI format(s), the PDCCH(s)), where the PRBs 491 may or may not be frequency contiguous and/or time contiguous, a UE 102 may be configured with one or more control resource sets (e.g., the CORESETs) and one DCI message may be mapped within one control resource set. In the frequency-domain, a PRB 491 is the resource unit size (which may or may not include DM-RS) for the DL control channel.

Figure 5:
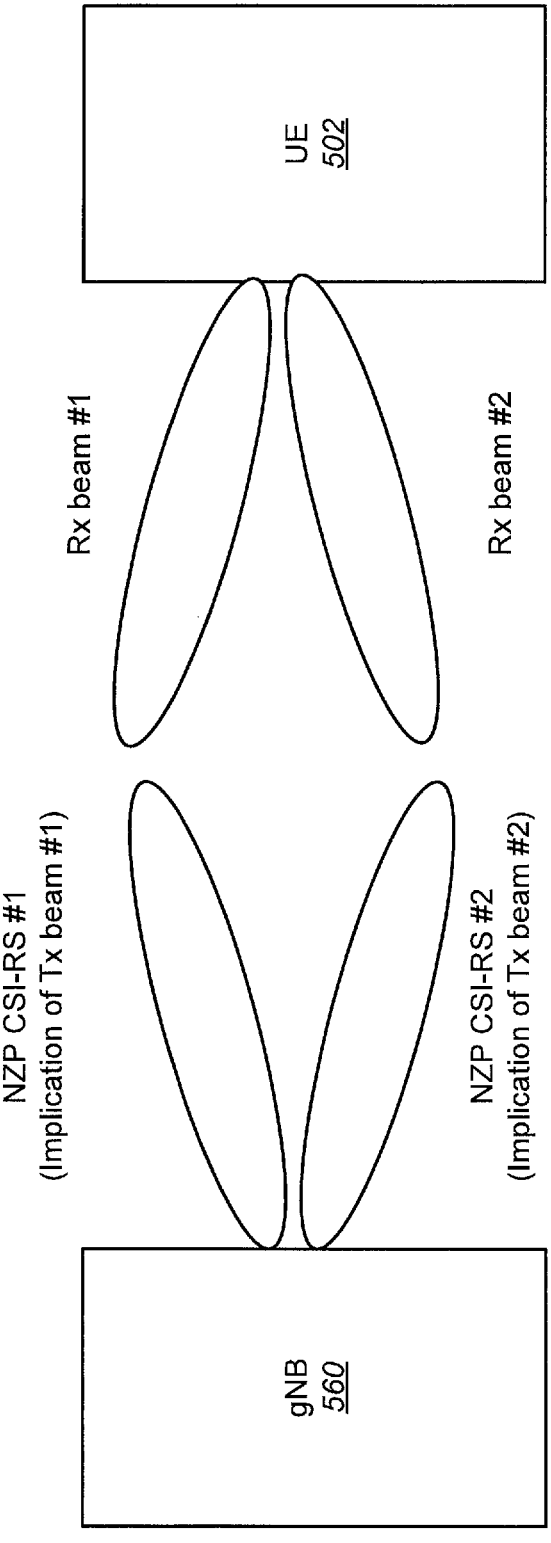
FIG. 5 illustrates an example of beamforming and quasi-colocation (QCL) type.

FIG. 5 illustrates an example of beamforming and quasi-colocation (QCL) type. For instance, FIG. 5 illustrates examples of a UE 502 and a gNB 560. In some implementations, the UE 502 described in relation to FIG. 5 may be an example of the UE 102 described in relation to FIG. 1 and/or the gNB 560 described in relation to FIG. 5 may be an example of the gNB 160 described in relation to FIG. 1. For example, one or more of the operations, functions, and/or procedures, etc., described in relation to FIG. 5 may be combined with and/or performed by the UE 102 and/or gNB 160 described in relation to FIG. 1. In NR, for instance, the gNB 560, and UE 502 may perform beamforming by having multiple antenna elements. The beamforming may be operated by using a directional antenna(s) and/or by applying phase shift for one or more antenna elements such that a high electric field strength to a certain spatial direction can be achieved. In some examples, beamforming may be referred to as and/or implemented by a "spatial domain transmission filter" or "spatial domain filter."

In the downlink, the gNB 560 may apply the transmission beamforming and transmit the DL channels and/or DL signals. Additionally or alternatively, a UE 502 may apply the reception beamforming and receive the DL channels and/or DL signals.

In the uplink, a UE 560 may apply the transmission beamforming and transmit the UL channels and/or UL signals. Additionally or alternatively, a gNB 560 may apply the reception beamforming and receive the UL channels and/or UL signals.

In some examples, beam correspondence may be defined according to a UE capability. For instance, the beam correspondence may be defined in accordance with one or more of the following:

In the downlink, a UE 502 can decide the transmission beamforming for UL channels and/or UL signals from the reception beamforming for DL channels and/or DL signals, and/or In the uplink, a gNB 560 can decide the transmission beamforming for DL channels and/or DL signals from the reception beamforming for UL channels and/or UL signals.

To adaptively switch, refine, or operate beamforming, beam management may be performed. For the beam management, NZP-CSI-RS(s) and/or SRS(s) may be used to measure the channel quality in the downlink and uplink, respectively. Specifically, in the downlink, gNB 560 may transmit one or more NZP CSI-RSs. The UE 502 may measure the one or more NZP CSI-RSs. In addition, the UE 502 may change the beamforming to receive each NZP CSI-RS. The UE 502 can identify which combination of transmission beamforming at gNB side corresponding to NZP CSI-RS corresponding and the reception beamforming at the UE side. In the uplink, a UE 502 may transmit one or more SRSs. The gNB 502 measure the one or more SRSs. In addition, the gNB 560 may change the reception beamforming to receive each SRS. The gNB 560 can identify which combination of transmission beamforming at gNB side corresponding to SRS corresponding and the reception beamforming at the gNB side.

To keep the link with transmission beam and reception for the communication between a gNB 560 and a UE 502, the quasi-colocation (QCL) assumption may be defined. Two antenna ports may be considered quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. One or more of the following QCL types may be defined:

QCL type A ('QCL-TypeA'): {Doppler shift, Doppler spread, average delay, delay spread}

QCL type B ('QCL-TypeB'): {Doppler shift, Doppler spread}

QCL type C ('QCL-TypeC'): {Doppler shift, average delay}

QCL type D ('QCL-TypeD') {Spatial Rx parameter}

QCL type D may be related to the beam management. For example, two NZP CSI-RS resources may be configured to a UE 502 and a NZP CSI-RS resource #1 and a NZP CSI-RS resource #2 may be used for beam #1 and beam #2, respectively. At a UE side, Rx beam #1 may be used for the reception of the NZP CSI-RS #1 and Rx beam #2 may be used for reception of the NZP CSI-RS #2 for beam management. The NZP CSI-RS resource #1 and NZP CSI-RS resource #2 may imply Tx beam #1 and Tx beam #2 respectively. A QCL type D assumption may be used for PDCCH and PDSCH and DL signals reception. When a UE 502 receives a PDCCH with the QCL type D assumption of NZP CSI-RS #1, the UE 502 may use the Rx beam #2 for the PDCCH reception.

For this purpose, a gNB 560 may configure transmission configuration indication (TCI) states to a UE 502. A TCI state may include one or more of the following:

One or more reference resource indices;

·QCL type for each of the one or more reference resource indices.

For example, if a TCI state includes QCL type D and NZP CSI-RS #1 (indicated to the UE 502, for instance), the UE 502 may apply Rx beam #1 to the reception of a PDCCH, a PDSCH, and/or DL signal(s). In other words, a UE 502 may determine the reception beam by using TCI states for reception of PDCCH, PDSCH, and/or DL signals.

FIG. 6 illustrates an example of TCI states. In this example, the seven TCI states may be configured and one of the configured TCI states may be used to receive PDCCH, PDSCH, and/or DL signals. For example, if a gNB 560 indicates TCI state #1, a UE 502 may assume the PDCCH, PDSCH, and/or DL signals is (are) quasi-colocated with the NZP CSI-RS corresponding to the NZP CSI-RS resource #1. A UE 502 may determine to use the reception beam when the UE 502 receives the NZP CSI-RS corresponding to the NZP CSI-RS resource #1.

Some approaches to indicate one TCI state to a UE 502 from a gNB 560 are described as follows. In the RRC messages, N TCI states may be configured by a RRC message. A gNB 560 may indicate one of the configured TCI states by DCI (e.g., DCI format 1_1 or DCI format 1_2). Additionally or alternatively, the gNB 560 may indicate one of the configured TCI by MAC CE. Additionally or alternatively, the MAC CE may select more than one TCI state from the configured TCI states and the DCI may indicate one of the more than one TCI states activated by MAC CE.

Examples of CSI-RS resource configuration are given as follows. For the CSI-RS configurations, a UE 502 may be configured with one or more CSI-RS resource sets by an RRC message. For example, a gNB 560 may transmit information including one or more CSI-RS resource set configurations, and a UE 502 may receive the information. Each CSI-RS resource set may include one or more CSI-RS resources and the corresponding CSI-RS resource indices.

Examples of SRS resource configuration are given as follows. For SRS configurations a UE 502 may be configured with one or more SRS resource sets by an RRC message. For example, a gNB 560 may transmit information including one or more SRS resource set configurations, and a UE 502 may receive the information. In some examples, an SRS resource set may be referred to as a panel and/or an SRS resource set index may be referred to as a panel index (or panel ID).

In addition, a configuration of a transmission beam for SRS transmission (e.g., SRS-SpatialRelationInfo) may be configured. The configuration of a transmission beam for SRS may include a serving cell index and/or information on a reference signal resource (e.g., SS/PBCH block index, CSI-RS resource index, and/or SRS index (SRI)). For a case of indication of an SRS resource index, an UL BWP index may also be included. In some examples, a UE 502 may use the same spatial domain transmission filter as follows:

1. the reception of an SS/PBCH block corresponding to the SS/PBCH block index in a case that a reference signal resource indicates SS/PBCH block index, or 2. the reception of a CSI-RS corresponding to the CSI-RS resource index in a case that a reference signal resource indicates the CSI-RS resource index, or 3. the transmission of an SRS corresponding to the SRS resource index on the UL BWP in a case that a reference signal resource indicates the SRS resource index and the UL BWP index.

Additionally or alternatively, when the DCI indicates aperiodic SRS transmission without an UL-SCH and without a CSI request, one or more of the following fields and/or a combination of more than one following fields in the DCI format (e.g., DCI format 0_1, DCI format 0_2, and/or other DCI format(s)) may be set specific or predefined values.

Frequency domain resource assignment field
Time domain resource assignment field
SRI field
SRS request field
CSI request field
Modulation and coding scheme field
New data indicator field
Redundancy version field
Precoding information and number of layers
Antenna ports field
UL-SCH indicator field The CRC bits of the DCI with UL-SCH and/or with a CSI request may be scrambled C-RNTI, MCS-C-RNTI, or CS-RNTI. The CRC bits of the DCI without UL-SCH and without a CSI request may be scrambled C-RNTI, MCS-C-RNTI, or CS-RNTI.

Additionally or alternatively, the DCI may indicate a time offset or an additional time offset of aperiodic SRS transmission. The time offset or the additional time offset indicates the number of slots of valid slots or the number of time units of available symbols or available slots. For example, a UE 102 may transmit an SRS(s) based on an available slot indicated by the time offset. Alternatively, a UE 102 may transmit an SRS(s) based on an available slot based on the higher layer (e.g., RRC) configured time offset and the indicated additional time offset. Here, an "available slot" may be a slot satisfying a condition that there is one or more UL or flexible symbol(s) for the time-domain location(s) for all the SRS resources in the resource set and that it satisfies UE capability on a minimum timing requirement between triggering PDCCH and all the SRS resources in the resource set.

Additionally or alternatively, the time offset or the additional time offset may be configured by RRC signaling. In some examples, multiple time offset values or multiple additional time offset values may be configured by RRC signaling and one value may be indicated by the DCI. Additionally or alternatively, MAC CE may select multiple time offset values or multiple additional time offset values from the configured values in RRC and one value may be indicated by the DCI. A field for the time offset or the additional time offset in the DCI may be configured by RRC.

Additionally or alternatively, a value of a parameter (denoted "PF") may be configured by RRC or indicated by the DCI. The value of $P_F$ may be used to determine the SRS transmission bandwidth. When the $P_F$ is applied in some approaches, a UE may transmit SRS only in $$\frac{1}{P_F} m_{SRS, B_{SRS}}$$

contiguous PRBs (RBs) in one OFDM symbol, where $M_{SRS, B_{SRS}}$ indicates a number of PRBs configured by $B_{SRS}$ and $C_{SRS}$ ($B_{SRS}$ and/or $C_{SRS}$ may be specified in 3GPP TS 38.211, v 16.5.0). The value of $P_F$ may be 2, 3, 4, or 8.

If a UE (e.g., UE 102) transmits SRS based on a configuration by SRS-ResourceSet on active uplink (UL) BWP b of carrier f of serving cell c using an SRS power control adjustment state with index l, the UE may determine the SRS transmission power $P_{SRS,b,f,c}$ (i, $q_s$, l) in an SRS transmission occasion i as given in Equation (1):

$$P_{SRS,b,f,c}(i, q_s, l) = \qquad (1)$$
$$\min\left\{ P_{CMAX,f,c}(i), \quad \begin{array}{l} P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{array} \right\}$$

where $P_{CMAX,f,c}(i)$ is the UE configured maximum output power for carrier f of serving cell c in SRS transmission occasion i, $P_{O\_SRS,b,f,c}$(As) is provided by p0 in an RRC layer for active UL BWP b of carrier f of serving cell c and SRS resource set $q_s$ provided by SRS-ResourceSet and SRS-resourceSetId, $M_{SRS,b,f,c}(i)$ is an SRS bandwidth expressed in number of RBs for SRS transmission occasion i on active UL BWP b of carrier f of serving cell c, u is a subcarrier spacing configuration, $\alpha_{SRS,b,f,c}(q_s)$ is provided by alpha in an RRC layer for active UL BWP b of carrier f of serving cell c and SRS resource set $q_s$, $PL_{b,f,c}(q_d)$ is a downlink pathloss estimate in decibels (dB) calculated by the UE using reference signal resource index $q_d$, and $h_{b,f,c}$ (i,l) is a transmission power adjustment state with index l for active UL BWP b of carrier f of serving cell c and SRS transmission occasion i. In some approaches, the SRS transmission power $P_{SRS,b,f,c}(i,q_s,l)$ may be expressed in decibels relative to 1 milliwatt (dBm).

A UE (e.g., UE 102) may be configured with $B_{SRS}$, $C_{SRS}$, and a value of a parameter $P_F$ to determine SRS bandwidth. If a UE (e.g., UE 102) is configured or indicated with the parameter $P_F$ and the UE transmits SRS based on a configuration by SRS-ResourceSet on active UL BWP b of carrier f of serving cell c using an SRS power control adjustment state with index l, the UE (e.g., UE 102) may determine the SRS transmission power $P_{SRS,b,f,c}(i,q_s,l)$ in SRS transmission occasion i as given in Equation (2):

$$P_{SRS,b,f,c}(i, q_s, l) = \qquad (2)$$
$$\min\left\{ P_{CMAX,f,c}(i), \begin{array}{l} P_{O\_SRS,b,f,c}(q_s) + 10\log_{10} P_F + \\ 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{array} \right\}$$

As shown in Equation (2), when the value of $P_F$ is configured or indicated, a UE (e.g., UE 102) may determine the SRS transmission power based on the value of $P_F$. When the value of $P_F$ is not configured and/or not indicated, the UE (e.g., UE 102) may determine the SRS transmission power based on Equation (1).

Additionally or alternatively, when the value of $P_F$ is configured or indicated, $M_{SRS,b,f,c}(i)$ may be determined based on the value of $P_F$. In some examples, a UE (e.g., UE

102) may determine the SRS transmission bandwidth $M_{SRS, b,f,c}(i)$ based on the configured parameters $B_{SRS}$, $C_{SRS}$, and a value of $P_F$. Additionally or alternatively, the value of $P_F$ may be used to determine the transmission power based on Equation (2). In some examples, the value of $P_F$ may be used to determine $M_{SRS,b,f,c}(i)$ only.

In some examples (in this disclosure, for instance), if a UE (e.g., UE 102) is not configured with the parameter $P_F$, Equation (1) may be used for SRS transmission power control, where $M_{SRS,b,f,c}(i)$ may be determined based on $B_{SRS}$ and $C_{SRS}$. In some examples, if a UE (e.g., UE 102) is configured with the parameter $P_F$, Equation (1) or Equation (2) may be used for SRS transmission power control, where $M_{SRS,b,f,c}(i)$ may be determined based on $B_{SRS}$, $C_{SRS}$, and the value of $P_F$ indicated by the DCI or MAC CE, or configured by RRC.

In some examples, when Equation (1) and the value of $P_F$ are used to determine the SRS transmission power, the value of $M_{SRS,b,f,c}(i)$ may be determined by the value of $P_F$. In some examples, when Equation (2) and the value of $P_F$ are used to determine the SRS transmission power, the value of $M_{SRS,b,f,c}(i)$ may be determined by the value of $P_F$ and 10 log $P_F$ may additionally be used to boost SRS transmission power.

As described above, a UE (e.g., UE 102) may determine the SRS transmission based on whether or not the parameter $P_F$ is configured by RRC. In some examples, the parameter $P_F$ may be configured for each carrier and/or for each serving cell and/or for each UL BWP per serving cell.

In some examples, one or more of the techniques, approaches, and/or examples described herein may be applied to SRS-based positioning. In some approaches, with a configuration by IE SRS-Positioning-Config on active UL BWP b of carrier f of serving cell c, the UE 102 may determine the SRS transmission power $P_{SRS,b,f,c}(i,q_s)$ in SRS transmission occasion i in accordance with Equation (1) and/or Equation (2). In some examples, the parameter $P_F$ may be used to determine the SRS transmission power boosting by reflecting the value of $P_F$ not in $M_{SRS,b,f,c}(i)$, but in 10 log, $P_F$.

Figure 7:
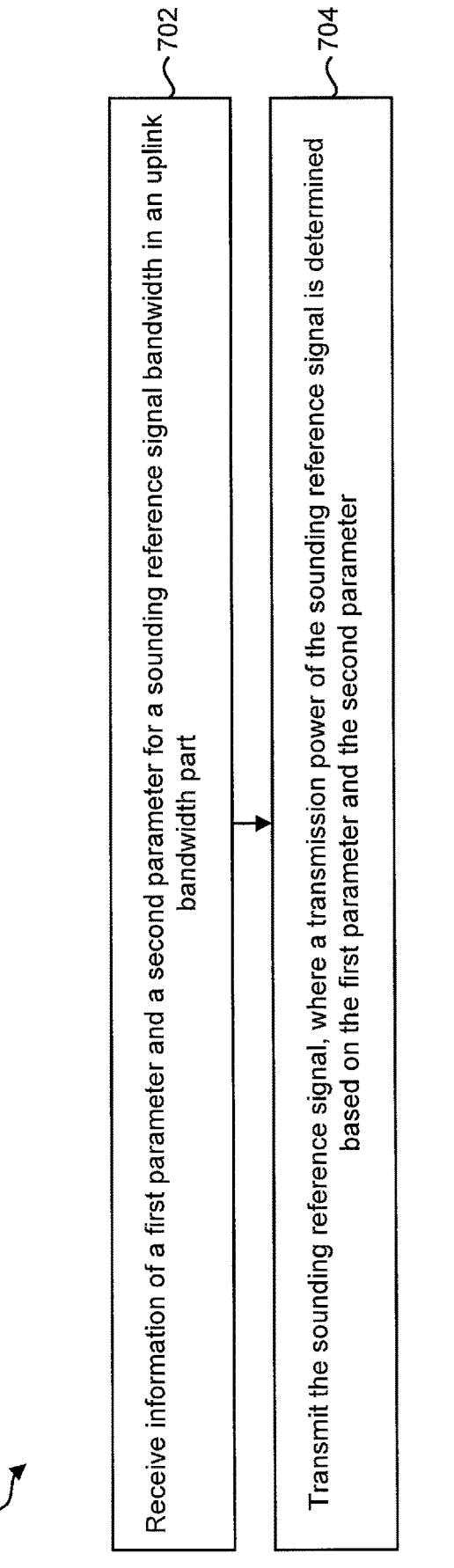
FIG. 7 is a flow diagram illustrating an example of a method for SRS communication.

FIG. 7 is a flow diagram illustrating an example of a method 700 for SRS communication. In some examples, the method 700 may be performed by a UE (e.g., the UE 102 described in relation to FIG. 1). For instance, the method 700 may be performed and/or controlled by the UE 102 (e.g., the UE operations module 124, the UE scheduling module 126, and/or one or more other components of the UE 102). In some examples, the method 700 may be performed when a third parameter (e.g., $P_F$) is not configured. For instance, the method 700 may provide an example of UE behavior in a case that $P_F$ is not configured.

A UE may receive 702 information of a first parameter and a second parameter for a sounding reference signal (SRS) bandwidth in an uplink bandwidth part (UL BWP). For example, a UE (e.g., UE 102) may be configured with (and/or receive information of) $B_{SRS}$ and $C_{SRS}$ to determine the SRS bandwidth and/or transmission power.

The UE may transmit 704 the SRS, where a transmission power of the SRS is determined based on the first parameter and the second parameter. For example, the UE may determine the transmission power of the SRS based on the first parameter and the second parameter (without a third parameter (e.g., $P_F$), for instance). The UE may transmit the SRS at the determined transmission power. In some examples, the method 700 may include one or more of the functions, operations, approaches, and/or examples described herein. For instance, the method 700 may include one or more of the functions, operations, approaches, and/or examples described in relation to FIG. 1 and/or FIG. 6.

Figure 8:
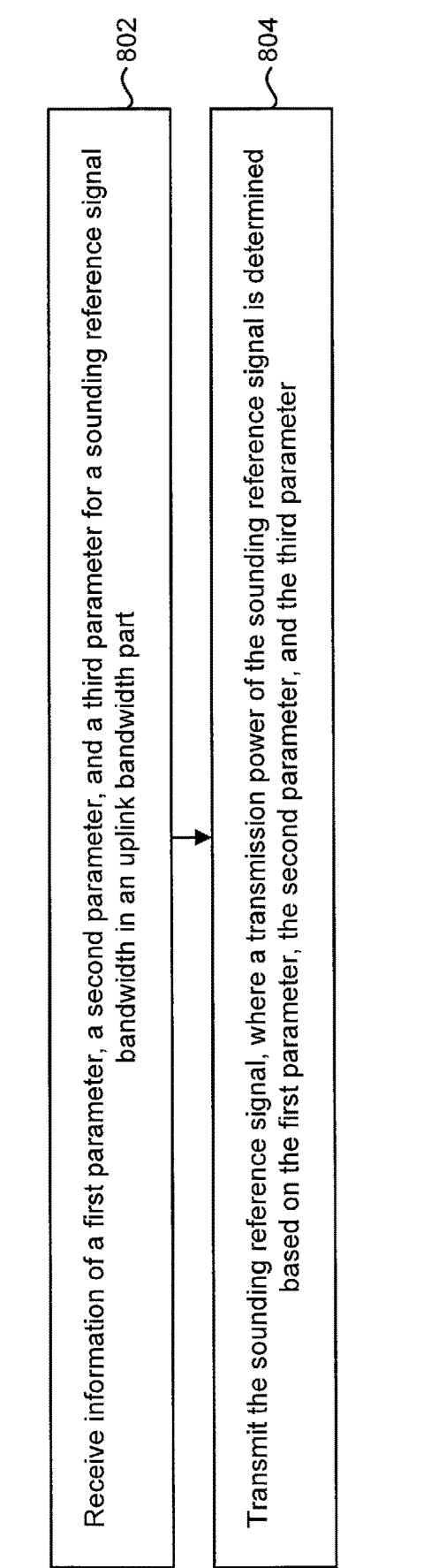
FIG. 8 is a flow diagram illustrating another example of a method for SRS communication.

FIG. 8 is a flow diagram illustrating another example of a method 800 for SRS communication. In some examples, the method 800 may be performed by a UE (e.g., the UE 102 described in relation to FIG. 1). For instance, the method 800 may be performed and/or controlled by the UE 102 (e.g., the UE operations module 124, the UE scheduling module 126, and/or one or more other components of the UE 102). In some examples, the method 800 may be performed when a third parameter (e.g., $P_F$) is configured. For instance, the method 800 may provide an example of UE behavior in a case that $P_F$ is configured.

A UE may receive 802 information of a first parameter, a second parameter, and a third parameter for a sounding reference signal (SRS) bandwidth in an uplink bandwidth part (UL BWP). For example, a UE (e.g., UE 102) may be configured with $B_{SRS}$, $C_{SRS}$, and $P_F$ to determine the SRS bandwidth and/or transmission power.

The UE may transmit 804 the SRS, where a transmission power of the SRS is determined based on the first parameter, the second parameter, and the third parameter. For example, the UE may determine the transmission power of the SRS based on the first parameter, the second parameter, and the third parameter (e.g., $P_F$). The UE may transmit the SRS at the determined transmission power. In some examples, the method 800 may include one or more of the functions, operations, approaches, and/or examples described herein. For instance, the method 800 may include one or more of the functions, operations, approaches, and/or examples described in relation to FIG. 1 and/or FIG. 6.

In some examples, one or more elements of the method 700 described in FIG. 7 and one or more elements of the method 800 described in FIG. 8 may be combined. For instance, a UE (e.g., UE 102) may determine whether a third parameter (e.g., $P_F$) is configured and/or received. If the third parameter is not configured and/or received, the UE may determine an SRS bandwidth and/or transmission power based on the first parameter and the second parameter as described in relation to FIG. 7. If the third parameter is configured and/or received, the UE may determine an SRS bandwidth and/or transmission power based on the first parameter, the second parameter, and the third parameter as described in relation to FIG. 8.

In some examples, a base station (e.g., gNB 160) may configure and/or transmit the first parameter, the second parameter, and/or the third parameter. The base station may receive an SRS, where the SRS bandwidth and/or the transmission power are determined based on the first parameter, the second parameter, and/or the third parameter. For instance, if the base station configures and/or transmits the first parameter and the second parameter (without the third parameter (e.g., $P_F$)), the base station may receive an SRS, where the SRS bandwidth and/or transmission power are determined based on the first parameter and the second parameter (without the third parameter (e.g., $P_F$), for instance). If the base station configures and/or transmits the first parameter, the second parameter, and the third parameter (e.g., $P_F$), the base station may receive an SRS, where the SRS bandwidth and/or transmission power are determined based on the first parameter, the second parameter, and the third parameter (e.g., $P_F$), for instance.

Figure 9:
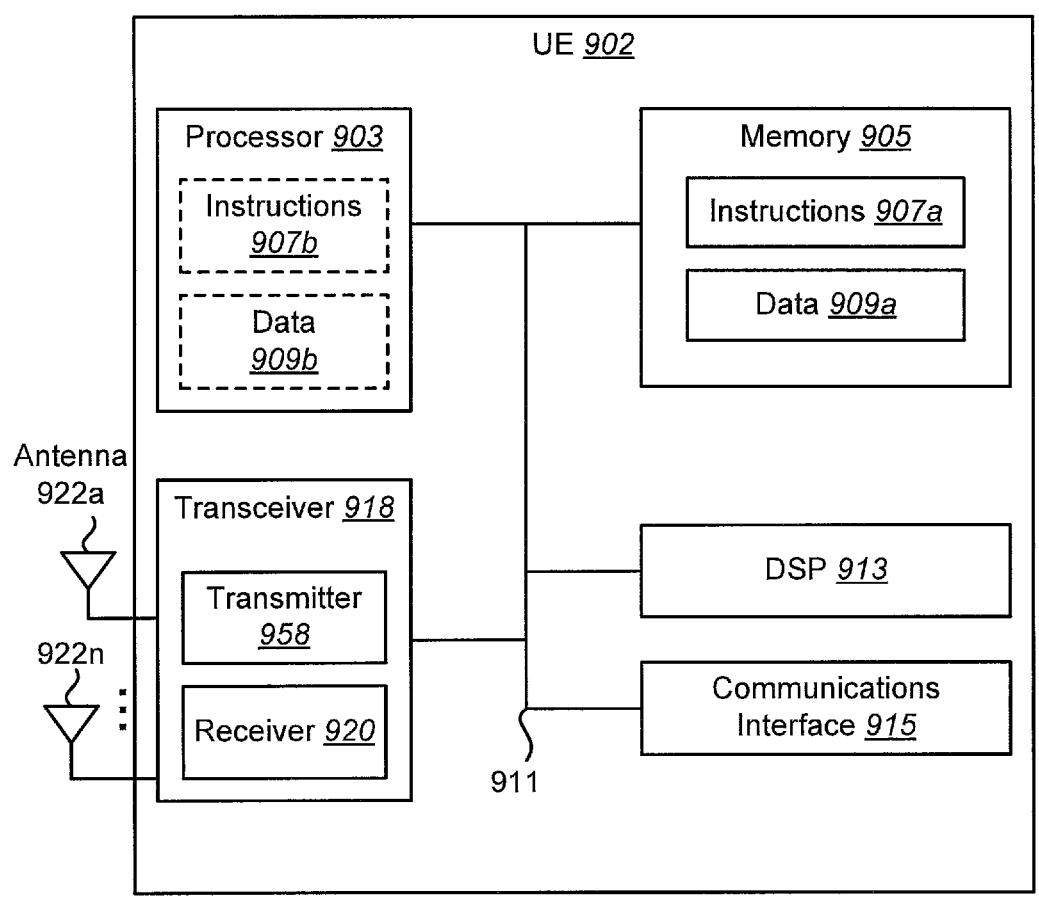
FIG. 9 illustrates various components that may be utilized in a UE.

FIG. 9 illustrates various components that may be utilized in a UE 902. The UE 902 described in connection with FIG. 9 may be implemented in accordance with the UE 102 described in connection with FIG. 1 in some examples. The UE 902 includes a processor 903 that controls operation of the UE 902. The processor 903 may also be referred to as a central processing unit (CPU). Memory 905, which may include read-only memory (ROM), random access memory (RAM), a combination of the two or any type of device that may store information, provides instructions 907a and data 909a to the processor 903. A portion of the memory 905 may also include non-volatile random access memory (NVRAM). Instructions 907b and data 909b may also reside in the processor 903. Instructions 907b and/or data 909b loaded into the processor 903 may also include instructions 907a and/or data 909a from memory 905 that were loaded for execution or processing by the processor 903. The instructions 907b may be executed by the processor 903 to implement one or more of the methods, operations, functions, procedures, and/or examples described herein.

The UE 902 may also include a housing that contains one or more transmitters 958 and one or more receivers 920 to allow transmission and reception of data. The transmitter(s) 958 and receiver(s) 920 may be combined into one or more transceivers 918. One or more antennas 922a-n are attached to the housing and electrically coupled to the transceiver 918.

The various components of the UE 902 are coupled together by a bus system 911, which may include a power bus, a control signal bus, and a status signal bus, in addition to a data bus. However, for the sake of clarity, the various buses are illustrated in FIG. 9 as the bus system 911. The UE 902 may also include a digital signal processor (DSP) 913 for use in processing signals. The UE 902 may also include a communications interface 915 that provides user access to the functions of the UE 902. The UE 902 illustrated in FIG. 9 is a functional block diagram rather than a listing of specific components.

Figure 10:
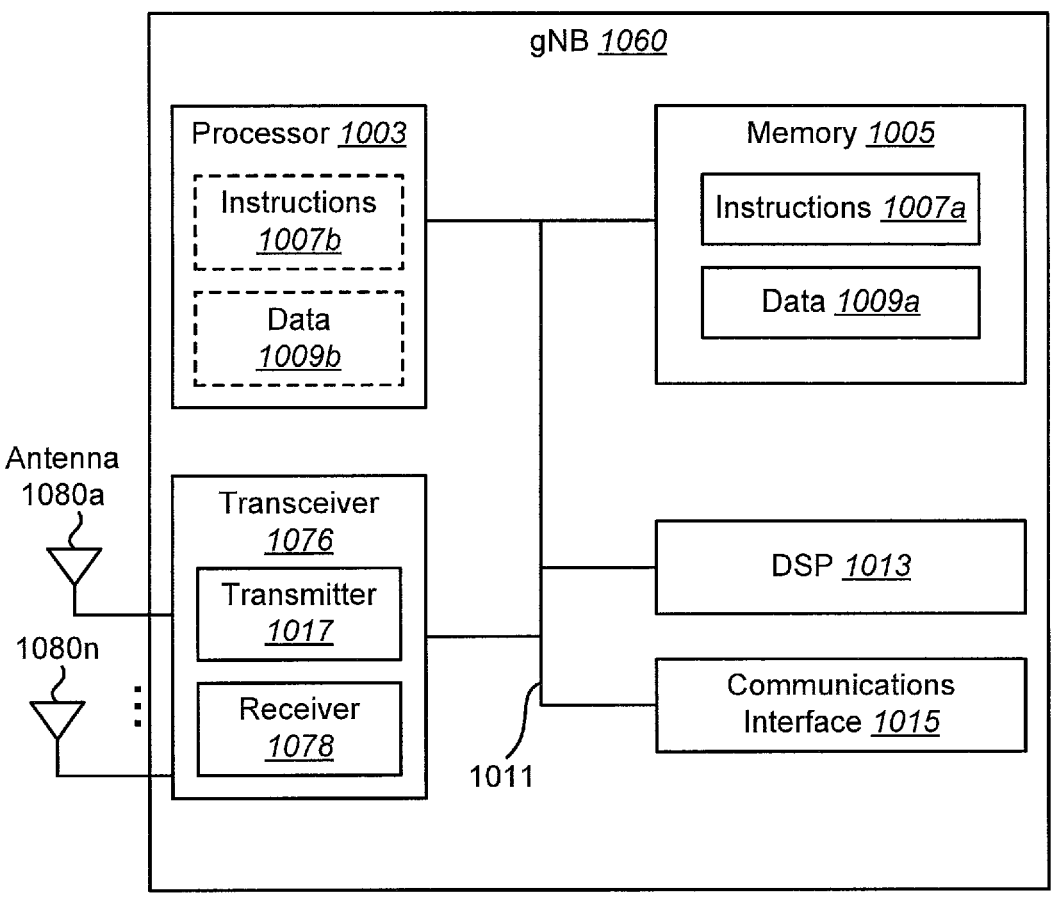
FIG. 10 illustrates various components that may be utilized in a gNB.

FIG. 10 illustrates various components that may be utilized in a gNB 1060. The gNB 1060 described in connection with FIG. 10 may be implemented in accordance with the gNB 160 described in connection with FIG. 1 in some examples. The gNB 1060 includes a processor 1003 that controls operation of the gNB 1060. The processor 1003 may also be referred to as a central processing unit (CPU). Memory 1005, which may include read-only memory (ROM), random access memory (RAM), a combination of the two or any type of device that may store information, provides instructions 1007a and data 1009a to the processor 1003. A portion of the memory 1005 may also include non-volatile random access memory (NVRAM). Instructions 1007b and data 1009b may also reside in the processor 1003. Instructions 1007b and/or data 1009b loaded into the processor 1003 may also include instructions 1007a and/or data 1009a from memory 1005 that were loaded for execution or processing by the processor 1003. The instructions 1007b may be executed by the processor 1003 to implement one or more of the methods, operations, functions, procedures, and/or examples described herein.

The gNB 1060 may also include a housing that contains one or more transmitters 1017 and one or more receivers 1078 to allow transmission and reception of data. The transmitter(s) 1017 and receiver(s) 1078 may be combined into one or more transceivers 1076. One or more antennas 1080a-n are attached to the housing and electrically coupled to the transceiver 1076.

The various components of the gNB 1060 are coupled together by a bus system 1011, which may include a power bus, a control signal bus, and a status signal bus, in addition to a data bus. However, for the sake of clarity, the various buses are illustrated in FIG. 10 as the bus system 1011. The gNB 1060 may also include a digital signal processor (DSP)

1013 for use in processing signals. The gNB 1060 may also include a communications interface 1015 that provides user access to the functions of the gNB 1060. The gNB 1060 illustrated in FIG. 10 is a functional block diagram rather than a listing of specific components.

Figure 11:
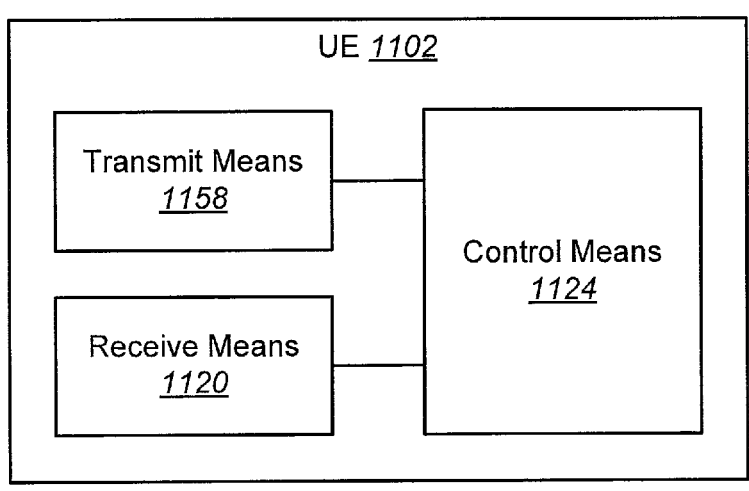
FIG. 11 is a block diagram illustrating one implementation of a UE in which one or more of the systems and/or methods described herein may be implemented.

FIG. 11 is a block diagram illustrating one implementation of a UE 1102 in which one or more of the systems and/or methods described herein may be implemented. The UE 1102 includes transmit means 1158, receive means 1120, and control means 1124. The transmit means 1158, receive means 1120, and control means 1124 may be configured to perform one or more of the functions described in connection with FIG. 1 above. FIG. 9 above illustrates one example of a concrete apparatus structure of FIG. 11. Other various structures may be implemented to realize one or more of the functions of FIG. 1. For example, a DSP may be realized by software.

Figure 12:
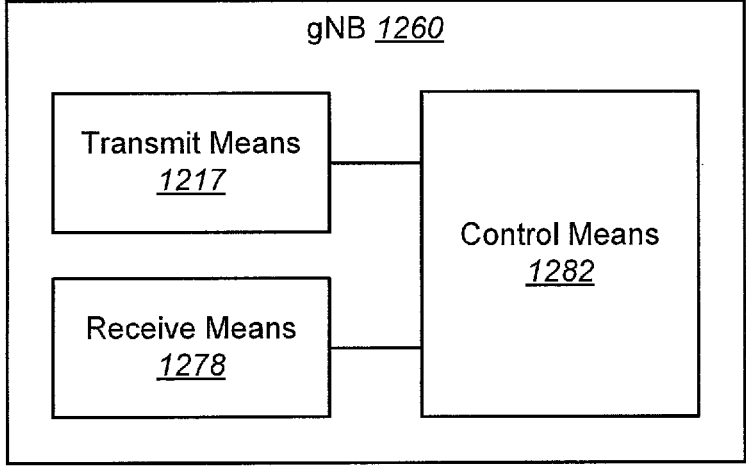
FIG. 12 is a block diagram illustrating one implementation of a gNB in which one or more of the systems and/or methods described herein may be implemented.

FIG. 12 is a block diagram illustrating one implementation of a gNB 1260 in which one or more of the systems and/or methods described herein may be implemented. The gNB 1260 includes transmit means 1217, receive means 1278, and control means 1282. The transmit means 1217, receive means 1278, and control means 1282 may be configured to perform one or more of the functions described in connection with FIG. 1 above. FIG. 10 above illustrates one example of a concrete apparatus structure of FIG. 12. Other various structures may be implemented to realize one or more of the functions of FIG. 1. For example, a DSP may be realized by software.

Figure 13:
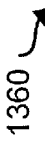
FIG. 13 is a block diagram illustrating one implementation of a gNB.

FIG. 13 is a block diagram illustrating one implementation of a gNB 1360. The gNB 1360 may be an example of the gNB 160 described in connection with FIG. 1. The gNB 1360 may include a higher layer processor 1323, a DL transmitter 1325, a UL receiver 1333, and one or more antenna 1331. The DL transmitter 1325 may include a PDCCH transmitter 1327 and a PDSCH transmitter 1329. The UL receiver 1333 may include a PUCCH receiver 1335 and a PUSCH receiver 1337.

The higher layer processor 1323 may manage physical layer's behaviors (the DL transmitter's and the UL receiver's behaviors) and provide higher layer parameters to the physical layer. The higher layer processor 1323 may obtain transport blocks from the physical layer. The higher layer processor 1323 may send/acquire higher layer messages such as an RRC message and MAC message to/from a UE's higher layer. The higher layer processor 1323 may provide the PDSCH transmitter 1329 transport blocks and provide the PDCCH transmitter 1327 transmission parameters related to the transport blocks.

The DL transmitter 1325 may multiplex downlink physical channels and downlink physical signals (including reservation signal) and transmit them via transmission antennas 1331. The UL receiver 1333 may receive multiplexed uplink physical channels and uplink physical signals via receiving antennas 1331 and de-multiplex them. The PUCCH receiver 1335 may provide the higher layer processor 1323 UCI. The PUSCH receiver 1337 may provide the higher layer processor 1323 received transport blocks.

Figure 14:
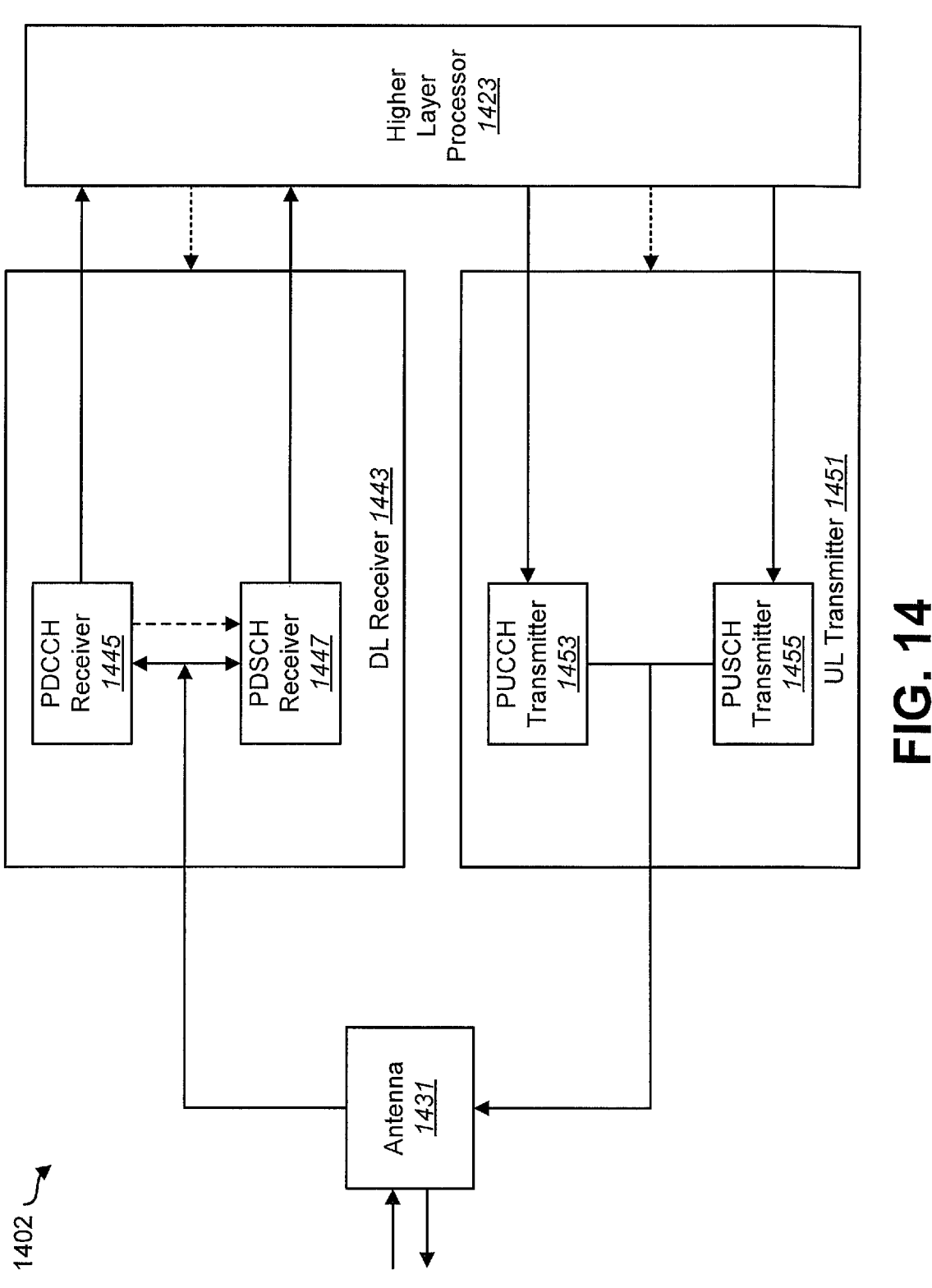
FIG. 14 is a block diagram illustrating one implementation of a UE.

FIG. 14 is a block diagram illustrating one implementation of a UE 1402. The UE 1402 may be an example of the UE 102 described in connection with FIG. 1. The UE 1402 may include a higher layer processor 1423, a UL transmitter 1451, a DL receiver 1443, and one or more antenna 1431. The UL transmitter 1451 may include a PUCCH transmitter 1453 and a PUSCH transmitter 1455. The DL receiver 1443 may include a PDCCH receiver 1445 and a PDSCH receiver 1447.

The higher layer processor 1423 may manage physical layer's behaviors (the UL transmitter's and the DL receiver's behaviors) and provide higher layer parameters to the physical layer. The higher layer processor 1423 may obtain transport blocks from the physical layer. The higher layer processor 1423 may send/acquire higher layer messages such as an RRC message and MAC message to/from a UE's higher layer. The higher layer processor 1423 may provide the PUSCH transmitter 1455 transport blocks and provide the PUCCH transmitter 1453 UCI.

The DL receiver 1443 may receive multiplexed downlink physical channels and downlink physical signals via receiving antennas 1431 and de-multiplex them. The PDCCH receiver 1445 may provide the higher layer processor 1423 DCI. The PDSCH receiver 1447 may provide the higher layer processor 1423 received transport blocks.

As described herein, some methods for the DL and/or UL transmissions may be applied (e.g., specified). In some examples, the combination of one or more of the methods and/or element(s) thereof described herein may be applied for the DL and/or UL transmission. The combination of the one or more of the methods and/or element(s) thereof described herein may not be precluded in the described systems and methods.

It should be noted that names of physical channels described herein are examples. In some examples, other names such as "NRPDCCH, NRPDSCH, NRPUCCH and NRPUSCH," "new Generation-(G)PDCCH, GPDSCH, GPUCCH and GPUSCH" or the like can be used.

The term "computer-readable medium" refers to any available medium that can be accessed by a computer or a processor. The term "computer-readable medium," as used herein, may denote a computer- and/or processor-readable medium that is non-transitory and tangible. By way of example and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

A program running on the gNB 160 or the UE 102 according to the described systems and methods may be a program (a program for causing a computer to operate) that controls a CPU and the like in such a manner as to realize the function according to the described systems and methods. Then, the information that is handled in these apparatuses may be temporarily stored in a RAM while being processed. Thereafter, the information may be stored in various ROMs or HDDs, and whenever necessary, may be read by the CPU to be modified or written. As a recording medium on which the program is stored, among a semiconductor (for example, a ROM, a nonvolatile memory card, and the like), an optical storage medium (for example, a DVD, a MO, a MD, a CD, a BD and the like), a magnetic storage medium (for example, a magnetic tape, a flexible disk and the like) and the like, any one may be possible. Furthermore, in some cases, the function according to the described systems and methods described herein may be realized by running the loaded program, and in addition, the function according to the described systems and methods may be realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described herein may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described herein may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:

1. A user equipment (UE), comprising:
reception circuitry configured to receive;
    in a case that a first parameter, a second parameter, and a third parameter are received, information of the first parameter, the second parameter, and the third parameter are used to determine a sounding reference signal (SRS) bandwidth in an uplink bandwidth part (UL BWP), or
    in a case that the first parameter and the second parameter are received, information of the first parameter and the second parameter are used to determine an SRS bandwidth in a BWP; and
transmission circuitry configured to transmit an SRS, wherein
    a transmission power of the SRS is determined by the SRS bandwidth expressed in a number of resource blocks (RBs) that is determined based on the first parameter and the second parameter.

2. A base station apparatus comprising:
transmission circuitry configured to transmit:
    in a case that a first parameter, a second parameter, and a third parameter are transmitted, information of the first parameter, the second parameter, and the third parameter are used to determine a sounding reference signal (SRS) bandwidth in an uplink bandwidth part (UL BWP), or
    in a case that the first parameter and the second parameter are transmitted, information of the first parameter and the second parameter are used to determine an SRS bandwidth in a UL BWP; and
reception circuitry configured to receive an SRS, wherein
    a transmission power of the SRS is determined by the SRS bandwidth expressed in a number of resource blocks (RBs) that is determined based on the first parameter and the second parameter.

3. A communication method performed by a user equipment (UE), the method comprising:
receiving:
    in a case that a first parameter, a second parameter, and a third parameter are received, information of the first parameter, the second parameter, and the third parameter are used to determine for a sounding reference signal (SRS) bandwidth in an uplink bandwidth part (UL BWP), or
    in a case that the first parameter and the second parameter are received, information of the first parameter and the second parameter are used to determine an SRS bandwidth in a UL BWP; and
transmitting an SRS, wherein
    a transmission power of the SRS is determined by the SRS bandwidth expressed in a number of resource blocks (RBs) that is determined based on the first parameter and the second parameter.

* * * * *